(12) United States Patent
Chen et al.

(10) Patent No.: US 11,114,015 B2
(45) Date of Patent: Sep. 7, 2021

(54) DISPLAY SUBSTRATE, MANUFACTURING METHOD THEREOF AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiaoxiao Chen, Beijing (CN); Wenjun Xiao, Beijing (CN); Shijun Wang, Beijing (CN); Bo Feng, Beijing (CN); Yang Wang, Beijing (CN); Haoliang Ji, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/853,288

(22) Filed: Apr. 20, 2020

(65) Prior Publication Data

US 2021/0134207 A1 May 6, 2021

(30) Foreign Application Priority Data

Oct. 30, 2019 (CN) .......................... 201911045299.1

(51) Int. Cl.
*G09G 3/20* (2006.01)
*H04M 1/02* (2006.01)

(52) U.S. Cl.
CPC ........ *G09G 3/2003* (2013.01); *H04M 1/0266* (2013.01); *G09G 2300/0452* (2013.01); *H04M 2201/38* (2013.01)

(58) Field of Classification Search
CPC ...... G09G 3/2003; G09G 2300/20452; H04M 1/0266; H04M 2201/38
USPC ......................................................... 345/694
See application file for complete search history.

(56) References Cited

U.S. PATENT DOCUMENTS

2018/0366076 A1* 12/2018 Chi ....................... G09G 3/3614

FOREIGN PATENT DOCUMENTS

CN         106201150 A    * 12/2016

\* cited by examiner

*Primary Examiner* — Mark Edwards
(74) *Attorney, Agent, or Firm* — Brooks Kushman P.C.

(57) ABSTRACT

A display substrate, a manufacturing method thereof, and a display device are provided. The display substrate includes multiple pixel units, multiple scan lines, and multiple data lines. Each pixel unit includes a first sub-pixel, a second sub-pixel, and a third sub-pixel having different colors. Sub-pixels having a same color are in a same sub-pixel row. The data line includes a first sub-data line and a second sub-data line, the first sub-pixels on two sides of each first sub-data line are electrically connected to a same first sub-data line and are driven through a same first sub-data line, and the second sub-pixel and the third sub-pixel in a same column are electrically connected to a same second sub-data line and are driven through a same second sub-data line.

20 Claims, 2 Drawing Sheets

|   |   |   |   |   |   |   |   |   |   |   |   |   |
|---|---|---|---|---|---|---|---|---|---|---|---|---|
|   | + | + | − | − | + | + | − | − | + | + | − | − |
|   | −↑ | − | +↓ | + | − | −↑ | +↓ | + | −↑ | − | + | +↓ |
|   | + | + | − | − | + | + | − | − | + | + | − | − |
|   | + | + | − | − | + | + | − | − | + | + | − | − |
|   | − | −↑ | +↓ | + | −↑ | − | + | +↓ | −↑ | − | +↓ | + |
|   | + | + | − | − | + | + | − | − | + | + | − | − |

DISPLAY SUBSTRATE, MANUFACTURING METHOD THEREOF AND DISPLAY DEVICE

CROSS-REFERENCE TO RELATED APPLICATION

This application claims priority to Chinese Patent Application No. 201911045299.1 filed on Oct. 30, 2019, which is incorporated herein by reference in its entirety.

TECHNICAL FIELD

The present disclosure relates to the field of display technology, and in particular to a display substrate, a manufacturing method thereof, and a display device.

BACKGROUND

In the related technologies, display effect of a display device may be affected by the driving method.

SUMMARY

In a first aspect, some embodiments of the present disclosure provide a display substrate, including:
a substrate; and
multiple pixel units, multiple scan lines, and multiple data lines, where the multiple pixel units, the multiple scan lines, and the multiple data lines are on the substrate;
an extension direction of the scan line is different from an extension direction of the data line, each of the multiple pixel units includes a first sub-pixel, a second sub-pixel and a third sub-pixel, the first sub-pixel, the second sub-pixel and the third sub-pixel have different colors, sub-pixels having a same color in the multiple pixel units are located in a same sub-pixel row, and an extension direction of each sub-pixel row is the same as the extension direction of the scan line; and
the data line includes a first sub-data line and a second sub-data line, the first sub-pixels on two sides of each first sub-data line are electrically connected to a same first sub-data line and are driven via a same first sub-data line, and the second sub-pixel and the third sub-pixel in a same column are electrically connected to a same second sub-data line and are driven via a same second sub-data line.

In some embodiments, the first sub-data line is in a gap between two adjacent columns of sub-pixels.

In some embodiments, two adjacent first sub-data lines are spaced apart by two columns of sub-pixels.

In some embodiments, an electrode line or the second sub-data line is provided in the gap where the first sub-data line is provided, the first sub-pixel on a side of the electrode line or the second sub-data line away from the first sub-data line is electrically connected to the first sub-data line through a jumper wire.

In some embodiments, the jumper wire is on a side of the electrode line or the second sub-data line away from the base substrate, and is insulated from the electrode line or the second sub-data line.

In some embodiments, one of the second sub-pixel and the third sub-pixel is a red sub-pixel, and the other of the second sub-pixel and the third sub-pixel is a blue sub-pixel.

In some embodiments, the display substrate further includes a control transistor corresponding to each first sub-pixel, a control terminal of the control transistor is electrically connected to the scan line, a first terminal of the control transistor is electrically connected to the first sub-pixel, and a second terminal of the control transistor is electrically connected to the first sub-data line.

In some embodiments, the first sub-pixel is a green sub-pixel.

In some embodiments, the extension direction of the scan line is perpendicular to the extension direction of the data line.

In a second aspect, some embodiments of the present disclosure provide a display device, including the display substrate described in the above.

In a third aspect, some embodiments of the present disclosure provide a method for manufacturing a display substrate, including:
manufacturing multiple pixel units, multiple scan lines, and multiple data lines on a base substrate, where an extension direction of the scan line is different from an extension direction of the data line, each of the multiple pixel units includes a first sub-unit pixel, a second sub-pixel and a third sub-pixel, the first sub-pixel, the second sub-pixel and the third sub-pixel have different colors, sub-pixels having a same color in the multiple pixel units are in a same sub-pixel row, and an extension direction of each sub-pixel row is the same as the extension direction of the scan line;
the data line includes a first sub-data line and a second sub-data line, the first sub-pixels on two sides of each first sub-data line are electrically connected to a same first sub-data line and are driven via a same first sub-data line, and the second sub-pixel and the third sub-pixel in a same column are electrically connected to a same second sub-data line and are driven via a same second sub-data line.

In some embodiments, the manufacturing the multiple pixel units, the multiple scan lines, and the multiple data lines on the substrate includes:
manufacturing a jumper wire, where control transistors corresponding to at least a part of the first sub-pixels are each electrically connected to the first sub-data line through the jumper wire.

BRIEF DESCRIPTION OF THE DRAWINGS

In order to illustrate the technical solutions of the embodiments of the present disclosure more clearly, the drawings used in the descriptions of the embodiments of the present disclosure will be briefly introduced hereinafter. Apparently, the drawings in the following descriptions are only some embodiments of the present disclosure. For those of ordinary skill in the art, other drawings can be obtained based on these drawings without any creative efforts.

DETAILED DESCRIPTION

The technical solutions in the embodiments of the present disclosure will be clearly and completely described hereinafter with reference to the drawings in the embodiments of the present disclosure. Apparently, the described embodiments are a part of rather than all of the embodiments of the present disclosure. Based on the embodiments in the present disclosure, all other embodiments obtained by a person of ordinary skill in the art without any creative efforts shall fall within the protection scope of the present disclosure.

Figure 1:
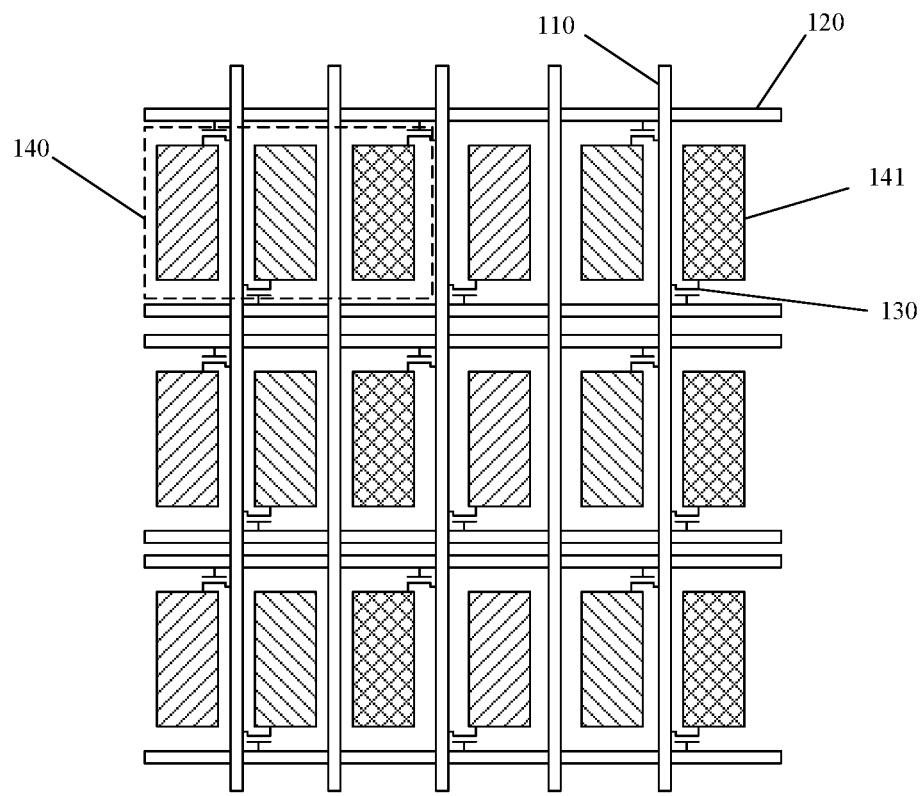
FIG. 1 is a schematic structural diagram of a display substrate in the related technologies.

Reference is made to FIG. 1, which is a schematic diagram of a partial structure of a display substrate in the related technologies. The display substrate includes a data line 110, a scan line 120, a control transistor 130, and multiple pixel units 140. 2*3 pixel units 140 (i.e., 6 pixel units) of the display substrate are shown in FIG. 1. Each pixel unit 140 includes three sub-pixels 141 of different colors. The sub-pixels 141 with different fill effects represent sub-pixels 141 of different colors. The sub-pixels 141 of the same color are located in a same column and are arranged along the direction of the data line 110.

As shown in FIG. 1, Dual Gate technology refers to the technical means of driving, with a data line (source), sub-pixels on the two sides. Since each data line can simultaneously drive sub-pixels on the two sides, the quantity of data lines can be reduced, which is beneficial to reducing cost.

However, for a small-sized display device, such as mobile phone or other electronic device, since the two columns of pixels driven by the same data line have the same polarity in the same frame, the light and dark in the same frame cannot be neutralized. Effects of the light and dark pixels, which cannot be neutralized, are superposed in space and time, and formation of rolling vertical lines on the display screen may be caused, which is often called "shake mura", affecting the display effect.

In view of the fact that the display panel in the related technologies may have rolling vertical lines that affect the display effect, some embodiments of the present disclosure provide a display substrate, a manufacturing method thereof, and a display device.

Figure 2:
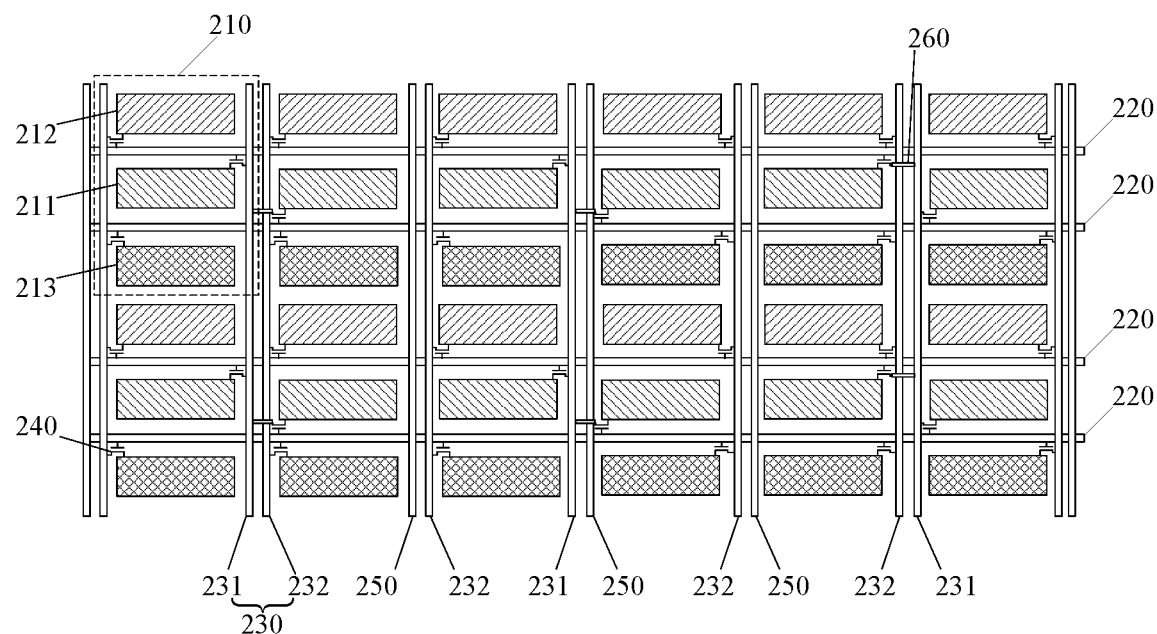
FIG. 2 is a schematic structural diagram of a display substrate in some embodiments of the present disclosure.

Some embodiments of the present disclosure provide a display substrate. As shown in FIG. 2, in some embodiments, the display substrate includes a base substrate, and includes multiple pixel units 210, multiple scan lines 220, and multiple data lines 230 on the base substrate.

In the embodiments of the present disclosure, the scan line 220 generally refers to a gate line of the display substrate, and the data line 230 generally refers to a source in a source-drain metal (SD). The scan lines 220 and the data lines 230 are staggered. For example, the scan line 220 is arranged along the lateral direction of the display substrate, and the data line 230 is arranged along the longitudinal direction of the display substrate. The embodiments of the present disclosure are not limited thereto. In actual implementation, the specific setting directions may be adjusted according to actual situations.

Each pixel unit 210 includes multiple sub-pixels, and the multiple sub-pixels include sub-pixels of different colors. For example, a display substrate includes sub-pixels of three colors of red (R), green (G), and blue (B). As another example, a display substrate includes sub-pixels of four colors of red (R), green (G), and blue (B) and white (W). The multiple sub-pixels include a first sub-pixel 211, a second sub-pixel 212, and a third sub-pixel 213. The first sub-pixel 211, the second sub-pixel 212, and the third sub-pixel 213 are sub-pixels of different colors, for example, the sub-pixel may be the red sub-pixel or the blue sub-pixel, or may be the green sub-pixel.

The sub-pixels of the multiple pixel units 210 is arranged in an array, the sub-pixels of the same color are located in the same sub-pixel row, and the extension direction of each sub-pixel row is the same as the extension direction of the scan line 220.

That is, in the display substrate in the related technologies shown in FIG. 1, the sub-pixels of the same color are arranged in columns along the extension direction of the data line 110, and in the extension direction of the scan line 120, the sub-pixels in the same row includes sub-pixels of different colors.

Different from the display substrate in the related technologies shown in FIG. 1, in the display substrate in the embodiments of the present disclosure, sub-pixels having only one color are included in each row along the extension direction of the scan line 220. For example, a row has only the first sub-pixels 211 with one color, and another row has only the second-sub-pixel 212 with one color, and so on.

The data line 230 includes a first sub-data line 231 and a second sub-data line 232.

The first sub-data line 231 is configured to drive the first sub-pixel 211, and the first sub-pixels 211 on two sides of each first sub-data line 231 are electrically connected to the each first sub-data line 231, that is, the first sub-pixels 211 located on both sides of the same first sub-data line 231 are all driven by the first sub-data line 231, in this way, their driving signals are also the same.

Each second sub-data line 232 is configured to drive the second sub-pixel 212 and the third sub-pixel 213 in the same column. That is, the second sub-pixels 212 and the third sub-pixels 213 in the same column are all electrically connected to the same second sub-data line 232, and the driving signals thereof are also provided by the second sub-data line 232.

When displaying an image, the polarities of the first sub-pixels 211 driven by the same first sub-data line 231 are the same. Since the driving method of the data line 230 is a column inversion method, in a case that a first sub-pixel 211 has brightness change, then there will be another first sub-pixel 211, whose brightness change is opposite to that of the first sub-pixel 211, in first sub-pixels 211 driven by another first sub-data line 231 adjacent to the first sub-data line 231 driving the first sub-pixel 211, thereby achieving complementary cancellation of brightness changes.

In the embodiments of the present disclosure, the first sub-pixels 211 are disposed along the extension direction of the scan line 220, and the first sub-pixels 211 located on both sides of the first sub-data line 231 are electrically connected to the first sub-data line 231, to drive two columns of the first sub-pixels 211 with the same color at the same time via the first sub-data line 231. Since the data line 230 is in a column inversion manner, polarities of sub-pixels which are adjacent or spaced apart by one or two pixel units 210 are opposite, so that brightness changes in multiple first sub-pixels 211 with a frame of image are cancelled out, thus reducing the possibility of forming rolling vertical lines and being beneficial to improving display effect.

Generally, each pixel unit 210 on the display substrate includes sub-pixels with multiple colors. For example, one of the second sub-pixel 212 and the third sub-pixel 213 is a red sub-pixel, and the other is a blue sub-pixel. Correspondingly, the first sub-pixel 211 is a green sub-pixel. In addition, the display substrate may further include other sub-pixels such as a fourth sub-pixel as required. Specifically, for example, a white sub-pixel may be provided.

Since the coupling pull-down effect during the charging process of the pixel unit 210 is mainly generated on the sub-pixels of one color, generally the green sub-pixels, so that the difference between light and dark is also mainly generated in the green sub-pixel rows when the premise of charging is satisfied. As a result, in the embodiments of the present disclosure, neutralization of brightness changes is mainly achieved by controlling the green sub-pixels. The second sub-pixel 212 and the third sub-pixel 213 may be driven by using the same second sub-data line 232.

Figures 3, 4:
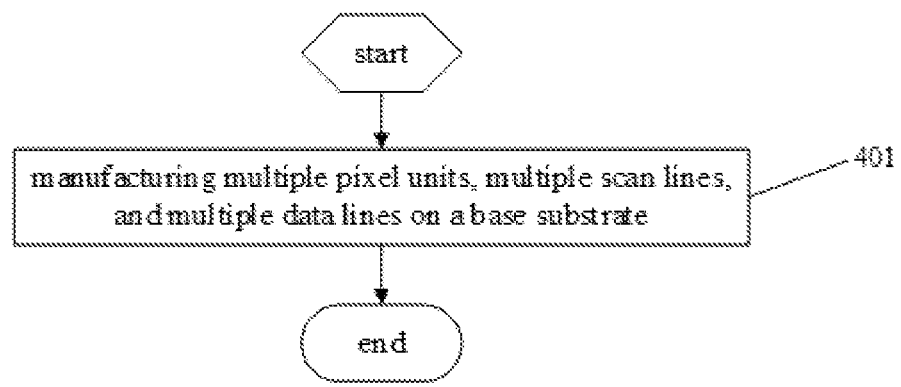
FIG. 3 is a schematic diagram of brightness change of pixels in a display substrate in some embodiments of the present disclosure.
FIG. 4 is a flowchart of a method for manufacturing a display substrate in some embodiments of the present disclosure.

As shown in FIG. 3, the plus and minus signs in FIG. 3 represent the polarities of the corresponding sub-pixels. Starting from the left, the green sub-pixels (i.e., the first sub-pixels 211) in every two columns of sub-pixels are driven by the same first sub-data line 231, and they have the same polarity. That is, the first and second columns on the left are driven by the same first sub-data line 231, and the third and fourth columns are driven by another first sub-data line 231, and so on.

Since the driving manner of the data line 230 is column inversion, the polarities of the green sub-pixels driven by the two adjacent first sub-data lines 231 in are opposite.

In FIG. 3, the upward arrow represents an increase in brightness, and the downward arrow represents a decrease in brightness. The green sub-pixels located in the same rounded frame represent first sub-pixels whose brightness changes are canceled out. In implementations, if there is a green sub-pixel with increase in brightness, for example, the brightness of a negative green sub-pixel in the second row and the first column being increased, and since the driving manner is column inversion, so that there is a positive green sub-pixel with decrease in brightness in the third and fourth columns, and brightness changes of the two green sub-pixels are cancelled out. In this way, when the brightness of a green sub-pixel changes, there will be a green sub-pixel with the opposite brightness change, and the first sub-data lines 231 driving the two green sub-pixels are adjacent. Hence, the two green sub-pixels may be adjacent, spaced apart by one sub-pixel, or spaced apart by two sub-pixels. It can also be understood that the distance between the two green sub-pixels is relatively short, so that brightness changes of the two green sub-pixels are cancelled out.

From the above analysis, it can be seen that the difference between light and dark is mainly generated in sub-pixels with one color, generally on the green sub-pixels, thus the arrangement of sub-pixels of other colors may not be particularly limited. In order to improve convenience of control of the various sub-pixels and to improve display uniformity of the display panel, in the embodiments of the present disclosure, sub-pixels of the same color are arranged in the same row, that is, the sub-pixels included in the multiple pixels are arranged in an array, and sub-pixels with a same color are located in a same row. The direction of each row refers to the extension direction of the scan line 220.

In some embodiments, the first sub-data line 231 is disposed in a gap between two adjacent columns of sub-pixels. Two adjacent first sub-data lines are separated by two columns of sub-pixels.

It should be understood that, in the embodiments of the present disclosure, each first sub-data line 231 simultaneously drives the first sub-pixels 211 on both sides thereof. Therefore, the quantity of the first sub-data lines 231 is half of the quantity of sub-pixel columns. The first sub-data lines 231 are arranged at intervals and each are arranged in a gap formed between two adjacent columns of sub-pixels, which can not only drive all the first sub-pixels 211, but also minimize the quantity of the first sub-data lines 231, thus being beneficial to reducing cost.

In some embodiments, the display substrate further includes a control transistor 240 corresponding to each first sub-pixel 211, a control terminal of the control transistor 240 is electrically connected to the scan line 220, a first terminal of the control transistor 240 and is electrically connected to the first sub-pixel 211, and a second end of the control transistor 240 is electrically connected to the first sub-data line 231.

Other structures may need to be provided in the gap between the sub-pixels where the first sub-data line 231 is located, for example, the second sub-data line 232 may be arranged, and an electrode line 250 may also be arranged. Therefore, a jumper wire 260 over these structures may be required, to realize that the control transistor 240 of each first sub-pixel 211 is electrically connected to the corresponding first sub-data line 231.

In a specific implementation, the jumper wire 260 is located on a side of the electrode line 250 or the second sub-data line 232 away from the base substrate, and is insulated from the electrode line or the second sub-data line. During implementations, an insulation layer may be provided, so that the jumper wire 260 is insulated from the electrode line 250 or the second sub-data line 232.

Some embodiments of the present disclosure also provide a display device, including the above display substrate.

The display device may include, but is not limited to, a mobile phone, a tablet computer, an e-book reader, a digital camera, a vehicle-mounted computer, a wearable device, or the like. Since the technical solutions of the embodiments of the present disclosure include all the technical solutions of the above embodiments, at least all the above technical effects can be achieved, which will not be repeated herein.

Some embodiments of the present disclosure provide a method for manufacturing a display substrate. The method may be used to manufacture the display substrate described in the above embodiments. As shown in FIG. 4, the method may include the following steps.

Step 401: manufacturing multiple pixel units, multiple scan lines, and multiple data lines on a base substrate.

In some embodiments, before step 401, the method may further include: providing the base substrate. In the embodiments of the present disclosure, scan lines and data lines are staggered, each pixel unit includes a first sub-pixel, a second sub-pixel and a third sub-pixel of different colors, multiple sub-pixels of the same color in multiple pixel units are in a same sub-pixel row, and each sub-pixel row extends in the same direction as the scan line.

The data lines include a first sub-data line and a second sub-data line. The first sub-pixels on two sides of each first sub-data line are electrically connected to a same first sub-data line and are driven via a same first sub-data line, and the second sub-pixel and the third sub-pixel in a same column are electrically connected to a same second sub-data line and are driven via a same second sub-data line.

For specific manufacturing processes and selection of materials, reference can be made to the related technologies, which are not further limited and described herein.

In some embodiments, the above step 401 includes:

manufacturing a jumper wire, where control transistors corresponding to at least a part of the first sub-pixels are each electrically connected to the first sub-data line through the jumper wire.

It should be understood that, in addition to the first sub-data line, there may be other structures in the gap between two adjacent columns of sub-pixels, such as an electrode line or the second sub-data line, so the first sub-data line may not be connected to the corresponding control transistor via a structure in a same layer. Therefore, in the embodiments of the present disclosure, a step of manufacturing the jumper wire is added. A conductive material is selected for the jumper wire, and a mask process (a process of exposing with a mask and etching) is used to manufacture the jumper wire. The mask process specifically includes steps of manufacturing a conductive material layer, coating photoresist, exposing by using a mask, developing, and etching. For the mask process, reference can be made to the related technologies, which will not be repeated herein.

Further, the jumper wire needs to be insulated from the electrode line or the second sub-data line. During implementations, it may be achieved by providing an insulating layer. For details, reference can be made to the related technologies, which is not further limited herein.

In the embodiments of the present disclosure, the first sub-pixels are disposed along the direction of the scan line, and the first sub-pixels located on both sides of the first sub-data line are electrically connected to the first sub-data line, to drive two columns of the first sub-pixels with the same color at the same time via the first sub-data line. Since the data line is in a column inversion manner, polarities of sub-pixels which are adjacent or spaced apart by one or two pixel are opposite, so that brightness changes in multiple first sub-pixels with a frame of image are cancelled out, thus reducing the possibility of forming rolling vertical lines and being beneficial to improving display effect.

In the embodiments of the present disclosure, the sequence number of the steps cannot be used to define the sequence of the steps. For those of ordinary skill in the art, the sequential changes of steps are also within the protection scope of the present disclosure without any creative efforts.

Unless otherwise defined, the technical or scientific terms used in the present disclosure shall have the common meanings understood by those of ordinary skill in the art to which the present disclosure belongs. The terms of "first", "second", and the like used in the present disclosure do not indicate any order, quantity, or importance, and are only used to distinguish different components. Words such as "including" or "comprising" mean that the element or item appearing before the words covers the element or item appearing after the words and the equivalent thereof, without excluding other elements or items. Words such as "connected" or "coupled" are not limited to physical or mechanical connections, and may include electrical connections, whether direct or indirect. "Up", "down", "left", "right", etc., are only used to indicate relative position relationship. When absolute position of a described object changes, the relative position relationship may change accordingly.

It will be understood that when an element such as a layer, film, region, or substrate is referred to as being "on" or "under" another element, it can be directly on or under the another element, or, there may be an intermediate element.

The above descriptions are only specific implementations of the present disclosure, and the protection scope of the present disclosure is not limited thereto. Changes or replacements made be a person skilled in the art within the technical scope disclosed in the present disclosure shall fall within the protection scope of the present disclosure. Therefore, the protection scope of the present disclosure should be determined according to the protection scope of the claims.

What is claimed is:

1. A display substrate, comprising:
   a base substrate; and
   a plurality of pixel units, a plurality of scan lines, and a plurality of data lines, wherein the plurality of pixel units, the plurality of scan lines, and the plurality of data lines are on the base substrate;
   wherein an extension direction of the scan line is different from an extension direction of the data line, each of the plurality of pixel units comprises a first sub-pixel, a second sub-pixel and a third sub-pixel, the first sub-pixel, the second sub-pixel and the third sub-pixel have different colors, sub-pixels having a same color in the plurality of pixel units are located in a same sub-pixel row, and an extension direction of each sub-pixel row is the same as the extension direction of the scan line; and
   wherein the data line comprises a first sub-data line and a second sub-data line, the first sub-pixels in two columns of sub-pixels on two sides of each first sub-data line are electrically connected to a same first sub-data line and are driven via a same first sub-data line, all the second sub-pixels and all the third sub-pixels in the two columns of sub-pixels are not electrically connected to the first sub-data line, and the second sub-pixel and the third sub-pixel in a same column are electrically connected to a same second sub-data line and are driven via a same second sub-data line.

2. The display substrate according to claim 1, wherein the first sub-data line is in a gap between two adjacent columns of sub-pixels.

3. The display substrate according to claim 2, wherein two adjacent first sub-data lines are spaced apart by two columns of sub-pixels.

4. The display substrate according to claim 3, wherein the number of the first sub-data line is more than one;
   in a first gap between two adjacent columns of sub-pixels, a first sub-data line of the more than one first sub-data line and an electrode line are provided;
   in a second gap between two adjacent columns of sub-pixels, a first sub-data line of the more than one first sub-data line and the second sub-data line are provided;
   the first sub-pixel on a side, of the electrode line in the first gap, away from the first sub-data line in the first gap, is electrically connected to the first sub-data line in the first gap through a jumper wire;
   the first sub-pixel on a side, of the second sub-data line in the second gap, away from the first sub-data line in the second gap, is electrically connected to the first sub-data line in the second gap through a jumper wire.

5. The display substrate according to claim 4, wherein the jumper wire is on a side of the electrode line or the second sub-data line away from the base substrate, and is insulated from the electrode line or the second sub-data line.

6. The display substrate according to claim 1, wherein one of the second sub-pixel and the third sub-pixel is a red sub-pixel, and the other of the second sub-pixel and the third sub-pixel is a blue sub-pixel.

7. The display substrate according to claim 1, further comprising a control transistor corresponding to each first sub-pixel, wherein a control terminal of the control transistor is electrically connected to the scan line, a first terminal of the control transistor is electrically connected to the first sub-pixel, and a second terminal of the control transistor is electrically connected to the first sub-data line.

8. The display substrate according to claim 1, wherein the first sub-pixel is a green sub-pixel.

9. The display substrate according to claim 1, wherein the extension direction of the scan line is perpendicular to the extension direction of the data line.

10. A display device, comprising a display substrate, wherein the display substrate comprises:
    a base substrate; and
    a plurality of pixel units, a plurality of scan lines, and a plurality of data lines, wherein the plurality of pixel units, the plurality of scan lines, and the plurality of data lines are located on the base substrate;

wherein an extension direction of the scan line is different from an extension direction of the data line, each of the plurality of pixel units comprises a first sub-pixel, a second sub-pixel and a third sub-pixel, the first sub-pixel, the second sub-pixel and the third sub-pixel have different colors, sub-pixels having a same color in the plurality of pixel units are in a same sub-pixel row, and an extension direction of each sub-pixel row is the same as the extension direction of the scan line; and wherein the data line comprises a first sub-data line and a second sub-data line, the first sub-pixels in two columns of sub-pixels on two sides of each first sub-data line are electrically connected to a same first sub-data line and are driven via a same first sub-data line, all the second sub-pixels and all the third sub-pixels in the two columns of sub-pixels are not electrically connected to the first sub-data line, and the second sub-pixel and the third sub-pixel in a same column are electrically connected to a same second sub-data line and are driven via a same second sub-data line.

11. The display device according to claim 10, wherein the first sub-data line is in a gap between two adjacent columns of sub-pixels.

12. The display device according to claim 11, wherein two adjacent first sub-data lines are spaced apart by two columns of sub-pixels.

13. The display device according to claim 12, wherein the number of the first sub-data line is more than one;
in a first gap between two adjacent columns of sub-pixels, a first sub-data line of the more than one first sub-data line and an electrode line are provided;
in a second gap between two adjacent columns of sub-pixels, a first sub-data line of the more than one first sub-data line and the second sub-data line are provided;
the first sub-pixel on a side, of the electrode line in the first gap, away from the first sub-data line in the first gap, is electrically connected to the first sub-data line in the first gap through a jumper wire;
the first sub-pixel on a side, of the second sub-data line in the second gap, away from the first sub-data line in the second gap, is electrically connected to the first sub-data line in the second gap through a jumper wire.

14. The display device according to claim 13, wherein the jumper wire is on a side of the electrode line or the second sub-data line away from the base substrate, and is insulated from the electrode line or the second sub-data line.

15. The display device according to claim 10, wherein one of the second sub-pixel and the third sub-pixel is a red sub-pixel, and the other of the second sub-pixel and the third sub-pixel is a blue sub-pixel; wherein the first sub-pixel is a green sub-pixel.

16. The display device according to claim 10, wherein the display substrate further comprises a control transistor corresponding to each first sub-pixel, a control terminal of the control transistor is electrically connected to the scan line, a first terminal of the control transistor is electrically connected to the first sub-pixel, and a second terminal of the control transistor is electrically connected to the first sub-data line.

17. The display device according to claim 10, wherein the extension direction of the scan line is perpendicular to the extension direction of the data line.

18. A method for manufacturing a display substrate, comprising:
manufacturing a plurality of pixel units, a plurality of scan lines, and a plurality of data lines on a base substrate, wherein an extension direction of the scan line is different from an extension direction of the data line, each of the plurality of pixel units comprises a first sub-unit pixel, a second sub-pixel and a third sub-pixel, the first sub-pixel, the second sub-pixel and the third sub-pixel have different colors, sub-pixels having a same color in the plurality of pixel units are in a same sub-pixel row, and an extension direction of each sub-pixel row is the same as the extension direction of the scan line;
wherein the data line comprises a first sub-data line and a second sub-data line, the first sub-pixels in two columns of sub-pixels on two sides of each first sub-data line are electrically connected to a same first sub-data line and are driven via a same first sub-data line, all the second sub-pixels and all the third sub-pixels in the two columns of sub-pixels are not electrically connected to the first sub-data line, and the second sub-pixel and the third sub-pixel in a same column are electrically connected to a same second sub-data line and are driven via a same second sub-data line.

19. The method for manufacturing the display substrate according to claim 18, wherein the manufacturing the plurality of pixel units, the plurality of scan lines, and the plurality of data lines on the base substrate comprises:
manufacturing a jumper wire, wherein control transistors corresponding to at least a part of the first sub-pixels are each electrically connected to the first sub-data line through the jumper wire.

20. The display substrate according to claim 1, wherein the number of the first sub-data line is more than one, the number of the second sub-data line is more than one, and the display substrate further comprises more than one electrode line;
in a first gap between two adjacent columns of sub-pixels, a first sub-data line of the more than one first sub-data line and an electrode line of the more than one electrode line are provided;
in a second gap between two adjacent columns of sub-pixels, a first sub-data line of the more than one first sub-data line and a second sub-data line of the more than one second sub-data line are provided;
in a third gap between two adjacent columns of sub-pixels, a second sub-data line of the more than one second sub-data line and an electrode line of the more than one electrode line are provided;
the first sub-pixel on a side, of the electrode line in the first gap, away from the first sub-data line in the first gap, is electrically connected to the first sub-data line in the first gap through a jumper wire;
the first sub-pixel on a side, of the second sub-data line in the second gap, away from the first sub-data line in the second gap, is electrically connected to the first sub-data line in the second gap through a jumper wire.

* * * * *